United States Patent
Baek et al.

(10) Patent No.: US 12,498,453 B2
(45) Date of Patent: Dec. 16, 2025

(54) CASCADED FMCW RADAR WITH SYNCHRONIZED PLL

(71) Applicant: CHUNG ANG UNIVERSITY INDUSTRY ACADEMIC COOPERATION FOUNDATION, Seoul (KR)

(72) Inventors: Dong Hyun Baek, Seoul (KR); Jeong Geun Kim, Seoul (KR); Goo Han Ko, Goyang-si (KR); Jun Young Park, Seoul (KR)

(73) Assignee: CHUNG ANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 290 days.

(21) Appl. No.: 18/222,368

(22) Filed: Jul. 14, 2023

(65) Prior Publication Data
US 2025/0020769 A1    Jan. 16, 2025

(30) Foreign Application Priority Data
Jul. 18, 2022    (KR) .......... 10-2022-0088216

(51) Int. Cl.
*G01S 7/35*    (2006.01)
*G01S 13/40*    (2006.01)

(52) U.S. Cl.
CPC .......... *G01S 7/35* (2013.01); *G01S 13/40* (2013.01)

(58) Field of Classification Search
CPC . G01S 7/35; G01S 13/87; G01S 7/032; G01S 13/40; G01S 13/931
See application file for complete search history.

(56) References Cited

U.S. PATENT DOCUMENTS

| | | | | |
|---|---|---|---|---|
| 5,317,284 | A * | 5/1994 | Yang | H03L 7/23 331/25 |
| 9,219,487 | B1 * | 12/2015 | Stuhlberger | H03C 3/0925 |
| 10,509,104 | B1 * | 12/2019 | Dato | G01S 13/87 |
| 10,627,480 | B2 * | 4/2020 | Nayyar | G01S 13/42 |

(Continued)

FOREIGN PATENT DOCUMENTS

| KR | 10-1908196 B1 | 10/2018 |
|---|---|---|
| KR | 10-2142503 B1 | 8/2020 |
| KR | 10-2313317 B1 | 10/2021 |

OTHER PUBLICATIONS

Adela, Bedilu Befekadu. Antennas for silicon-based mm-wave FMCW radars: antenna integration and MIMO system design. Technische Universiteit Eindhoven, 2019.

*Primary Examiner* — Peter M Bythrow
(74) *Attorney, Agent, or Firm* — Bridgeway IP Law Group, PLLC; Sang Ho Lee; Hyun Woo Shin (57) ABSTRACT

Provided is a cascaded FMCW radar, and more particularly, to a cascaded FMCW radar with a synchronized PLL. The cascaded FMCW radar includes a crystal oscillator generating a reference frequency signal having low-frequency characteristics, a cascade-array transceiver chip generating an output signal having high-frequency characteristics using the reference frequency signal through a signal generator provided therein, and an antenna transmitting the generated output signal to the outside in the form of an electromagnetic wave or receiving the electromagnetic wave from the outside.

7 Claims, 8 Drawing Sheets

(56) References Cited

U.S. PATENT DOCUMENTS

| | | | |
|---|---|---|---|
| 2010/0171648 A1* | 7/2010 | Himmelstoss | H03L 7/16 |
| | | | 342/103 |
| 2017/0131394 A1* | 5/2017 | Roger | G01S 13/343 |
| 2018/0348342 A1* | 12/2018 | Ginsburg | G01S 7/352 |
| 2019/0178983 A1* | 6/2019 | Lin | G01S 13/003 |
| 2020/0003862 A1 | 1/2020 | Doaré et al. | |
| 2020/0003882 A1* | 1/2020 | Salle | H04L 27/0008 |
| 2020/0072942 A1* | 3/2020 | Greslehner-Nimmervoll | |
| | | | G01S 7/28 |
| 2020/0136599 A1* | 4/2020 | Savary | H03K 5/1565 |
| 2020/0150256 A1* | 5/2020 | Dent | G01S 7/282 |
| 2020/0326416 A1* | 10/2020 | Albasha | G01S 13/02 |
| 2020/0386601 A1 | 12/2020 | Waelde et al. | |
| 2020/0386854 A1* | 12/2020 | Melzer | G01S 7/032 |
| 2021/0181326 A1* | 6/2021 | Kurvathodil | G01S 13/931 |
| 2021/0239787 A1* | 8/2021 | Li | G01S 13/343 |
| 2022/0026527 A1* | 1/2022 | Kulmer | G01S 7/4017 |
| 2022/0171021 A1* | 6/2022 | Liu | G01S 7/354 |
| 2022/0196796 A1* | 6/2022 | Fiore | G01S 13/581 |
| 2022/0283297 A1* | 9/2022 | Bialer | G01S 13/584 |
| 2022/0299601 A1* | 9/2022 | Jungmaier | G01S 7/35 |
| 2022/0308161 A1* | 9/2022 | Melzer | G01S 7/032 |
| 2023/0021026 A1* | 1/2023 | Kim | G01S 7/352 |
| 2023/0129011 A1* | 4/2023 | Lulu | H04B 1/403 |
| | | | 455/552.1 |
| 2023/0176180 A1* | 6/2023 | Findenig | G01S 7/032 |
| | | | 342/175 |

\* cited by examiner

CASCADED FMCW RADAR WITH SYNCHRONIZED PLL

CROSS-REFERENCE TO RELATED APPLICATIONS

This application claims the priority of Korean Patent Application No. 10-2022-0088216 filed on Jul. 18, 2022, in the Korean Intellectual Property Office, the disclosure of which is incorporated herein by reference.

BACKGROUND

Field

The present disclosure relates to a cascaded FMCW radar, and more particularly, to a cascaded FMCW radar with a synchronized PLL.

Description of the Related Art

In addition to an automotive industry, the demand for an FMCW radar is increasing in various fields such as security sensors, and risk detection sensors, in industrial sites, homes, and buildings.

The FMCW radar is a device for transmitting a signal in which a frequency changes linearly according to a time domain, and receiving a signal reflected from a front target, to detect a distance from a target, a speed, and an angle. In respect to the angle among them, a resolution is determined by the number of transmitter channels which a transceiving chip of the FMCW radar has.

The conventional FMCW radar uses only one transceiving chip with a limited number of receiver channels, so the angle resolution decreases a lot. Therefore, in recent years, it is active to study the cascaded FMCW radar, which is a method of increasing the total number of radar receiver channels using a plurality of transceiving chips at the same time.

On the other hand, in order to drive the cascaded FMCW radar, phase and output power characteristics of an output signal emitted from the transmitter of the entire system must be the same. However, since the conventional cascaded FMCW radar uses a signal with high frequency characteristics, it is difficult to implement and expand the circuit, and it is very difficult to synchronize the frequency characteristics of the output signal.

In addition, the conventional cascaded FMCW radar has a structure in which one transceiving chip becomes a master to operate a phase locked loop, and the remaining transceiving chips become a slave to receive a high-frequency signal output by the master transceiving chip to use the received high-frequency signal as a mixer of a receiver and an output of a transmitter. Accordingly, a transmission line and a power divider are essentially needed, which is a problem leading to an increase in the area of a radar system.

SUMMARY

An object of the present disclosure is to provide a cascaded FMCW radar which synchronizes all signal generators integrated in respective transceiver chips with one crystal oscillator and controls a modulation start time equally with a trigger signal to easily implement and expand a circuit.

Further, another object of the present disclosure is to provide a cascaded FMCW radar which removes a transmission line and a power divider to miniaturize the circuit and enhance economics.

Further, yet another object of the present disclosure is to provide a cascaded FMCW radar which reduces a requested performance of a power amplifier to reduce power consumption of an entire system.

The objects of the present disclosure are not limited to the above-mentioned objects, and other objects and advantages of the present disclosure that are not mentioned may be understood by the following description, and will be more clearly understood by embodiments of the present disclosure. Further, it will be readily appreciated that the objects and advantages of the present disclosure may be realized by means and combinations shown in the claims.

According to an aspect of the present disclosure, a cascaded FMCW radar according to an exemplary embodiment of the present disclosure includes: a crystal oscillator generating a reference frequency signal having low-frequency characteristics; a cascade-array transceiver chip generating an output signal having high-frequency characteristics using the reference frequency signal through a signal generator provided therein; and an antenna transmitting the generated output signal to the outside in the form of an electromagnetic wave or receiving the electromagnetic wave from the outside.

Further, the transceiver chips include a plurality of transceiver chips including a phase lock loop, and the plurality of transceiver chips receives a reference frequency from the crystal oscillator.

Further, the transceiver chip includes one master transceiver chip generating a trigger signal and at least one slave transceiver chip receiving the trigger signal.

Further, the transceiver chip includes a plurality of slave transceiver chips receiving the trigger signal from the outside.

The transceiver chips are synchronized by starting frequency modulation based on the trigger signal.

Further, the signal generator includes a voltage-controlled oscillator (VCO), a phase lock loop (PLL), and a radar waveform generator.

Further, the output signal has a frequency 10 times or higher than the reference frequency.

Further, the transceiver chip includes a power amplifier (AMP) that assists generation of the output signal by amplifying an electrical performance of the signal generator.

According to an exemplary embodiment of the present disclosure, a cascaded FMCW radar may easily implement and expand a circuit using a reference frequency and a trigger signal having low-frequency characteristics.

Further, according to an exemplary embodiment of the present disclosure, the cascaded FMCW radar removes a transmission line and a power divider to miniaturize the circuit to enhance economics.

Further, according to an exemplary embodiment of the present disclosure, the cascaded FMCW radar reduces a requested performance of a power amplifier to reduce power consumption of an entire system.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

The present disclosure may have various modifications and various exemplary embodiments and specific exemplary embodiments will be illustrated in the drawings and described in detail in the detailed description. However, this does not limit the present disclosure to specific exemplary embodiments, and it should be understood that the present disclosure covers all the modifications, equivalents and replacements included within the idea and technical scope of the present disclosure. In describing each drawing, reference numerals refer to like elements.

Terms including as first, second, A, and B are used for describing various constituent elements, but the constituent elements are not limited by the terms. The terms are used only to discriminate one component from another component. For example, a first component may be referred to as a second component, and similarly, the second component may be referred to as the first component without departing from the scope of the present disclosure. A term 'and/or' includes a combination of a plurality of associated disclosed items or any item of the plurality of associated disclosed items.

It should be understood that, when it is described that a component is "connected to" or "accesses" another component, the component may be directly connected to or access the other component or a third component may be present therebetween. In contrast, when it is described that a component is "directly connected to" or "directly accesses" another component, it is understood that no element is present between the element and another element.

Terms used in the present application are used only to describe specific exemplary embodiments, and are not intended to limit the present disclosure. A singular form includes a plural form if there is no clearly opposite meaning in the context. In the present application, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, preferred embodiments of the present disclosure will be described in detail with reference to the accompanying drawings.

Figure 1:
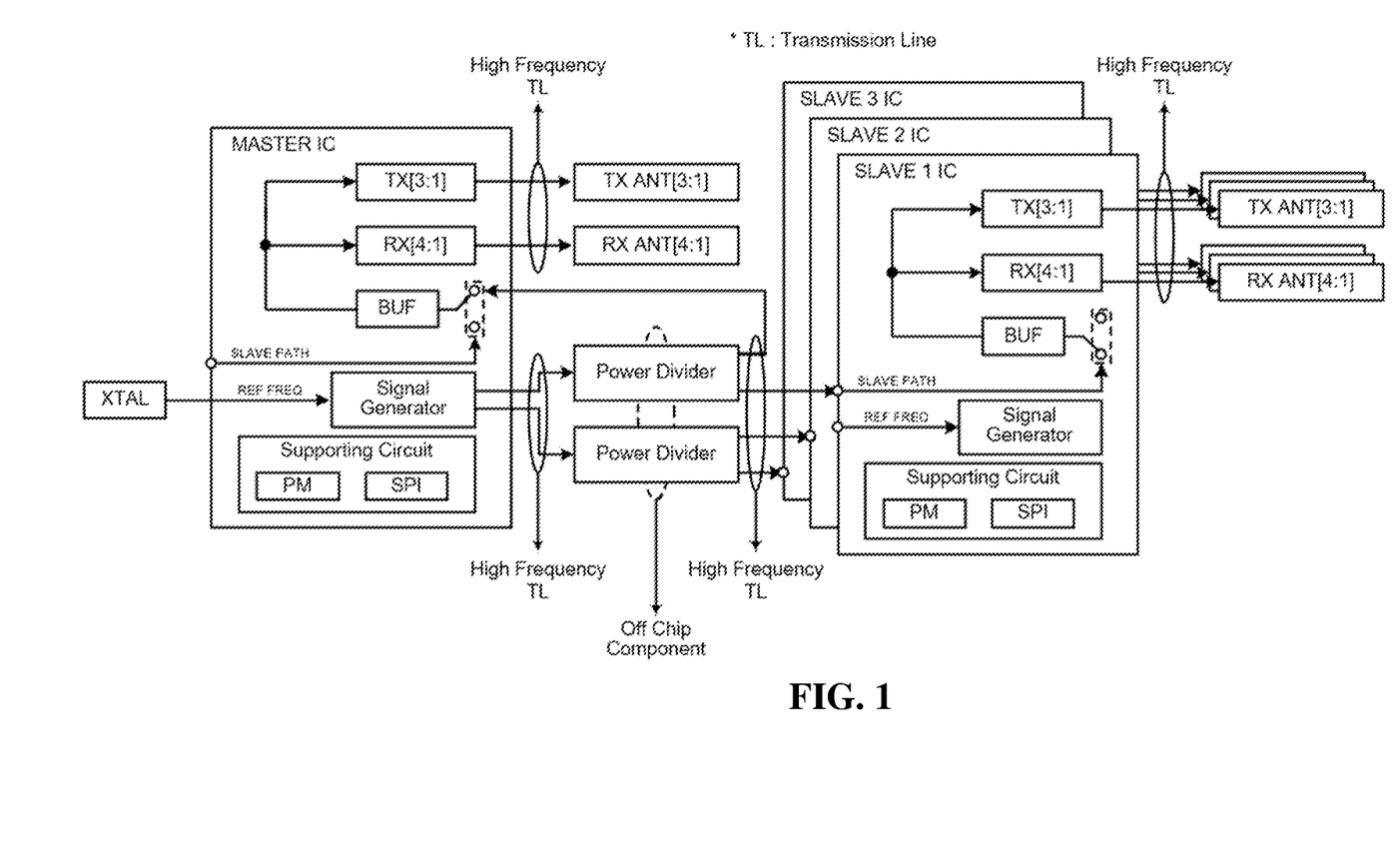
FIGS. 1 and 2 are block diagrams illustrating a structure of a cascaded FMCW radar in the related art.
Figure 2:
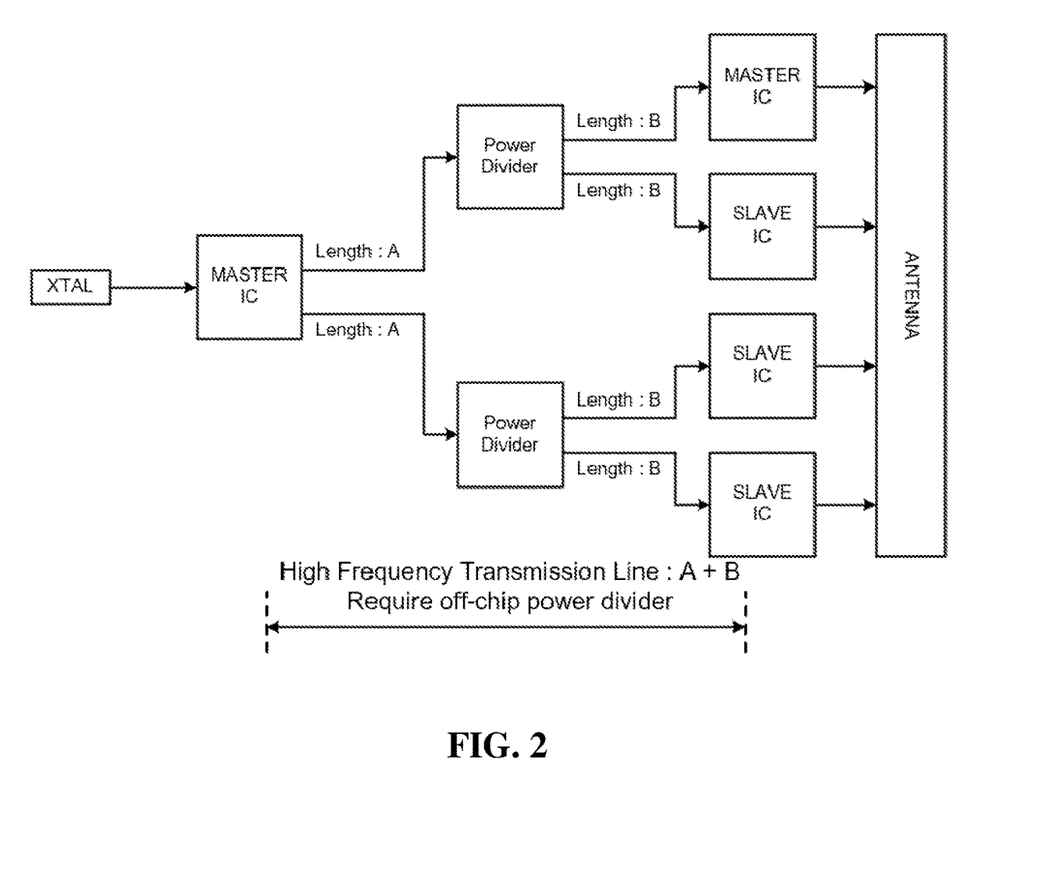

FIGS. 1 and 2 are block diagrams illustrating a structure of a cascaded FMCW radar in the related art.

Referring to FIGS. 1 and 2, the cascaded FMCW radar in the related art may include a crystal oscillator XTAL, a transceiver chip IC, an antenna TX ANT, and a power divider.

The crystal oscillator XTAL generates a signal having a reference frequency REF FREQ using a mechanical resonance generated when a crystal of a piezoelectric material vibrates. The generated signal has low-frequency characteristics from tens of kHz to tens of MHz, and hereinafter, the present disclosure will be described by premising that a signal generated from the crystal oscillator used in the present disclosure is 80 MHz.

The transceiver chip IC as an integrated circuit that transmits or receives a radio signal may be plural. One of the plurality of transceiver chips receives the signal generated from the crystal oscillator, and operates as the master transceiver chip MASTER IC.

The signal generator provided inside the master transceiver chip generates the high-frequency output signal and modulates an output signal for an FMCW radar operation by receiving a reference frequency signal. In this case, the output signal may have a frequency of 77 GHz.

Meanwhile, the remaining transceiver chips other than the master transceiver chip operate as the slave transceiver chip SLAVE IC, and the output signal output by the master transceiver chip is delivered to the slave transceiver chip via the power divider as illustrated in FIG. 2.

The power divider divides an input signal into two output signals, and in this process, since power is divided, a power amplifier Power AMP (not illustrated) included in the master transceiver chip should output high power by considering the divided power. Therefore, a high amplification performance of the power amplifier is required.

The slave transceiver chip operates in a bypass mode. That is, the signal generator included in the slave transceiver chip does not operate, but the input signal is output as it is. Referring back to FIG. 1, the output signal having the high-frequency characteristics, which is delivered from the power divider is output to the antenna TX ANT through a buffer BUF of each of slave transceiver chips SLAVE 1 IC, SLAVE 2 IC, and SLAVE 3 IC as it is.

In this case, the cascaded FMCW radar in the related art additionally requires RF transmission lines between the master transceiver chip and the power divider (length: A) and between the power divider and the slave transceiver chip (length: B) in addition to an RF transmission line RF TL transmitted by an antenna.

Figure 3:
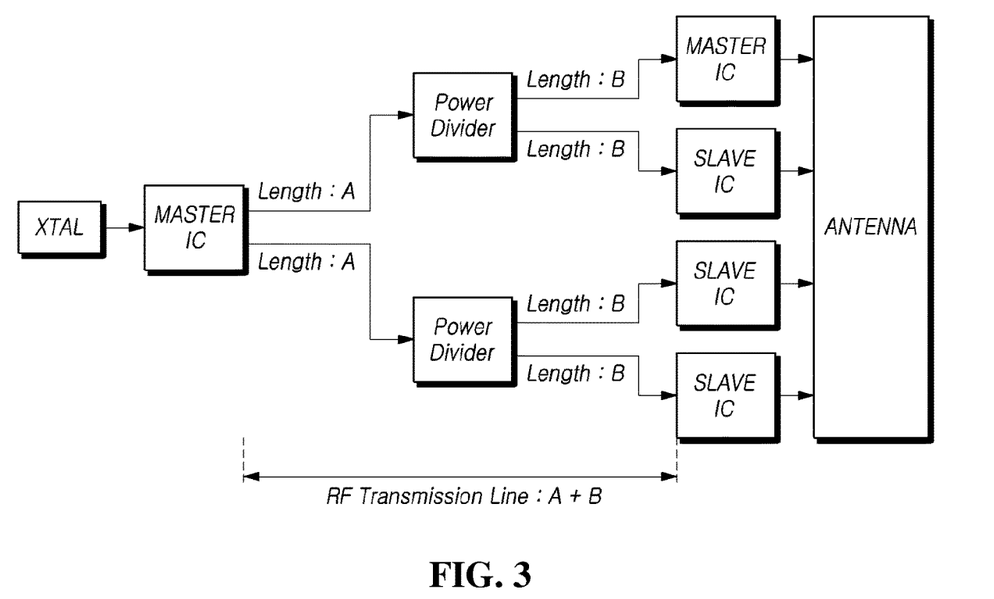
FIGS. 3 to 5 are block diagrams illustrating a structure of a cascaded FMCW radar according to an exemplary embodiment of the present disclosure.
Figure 4:
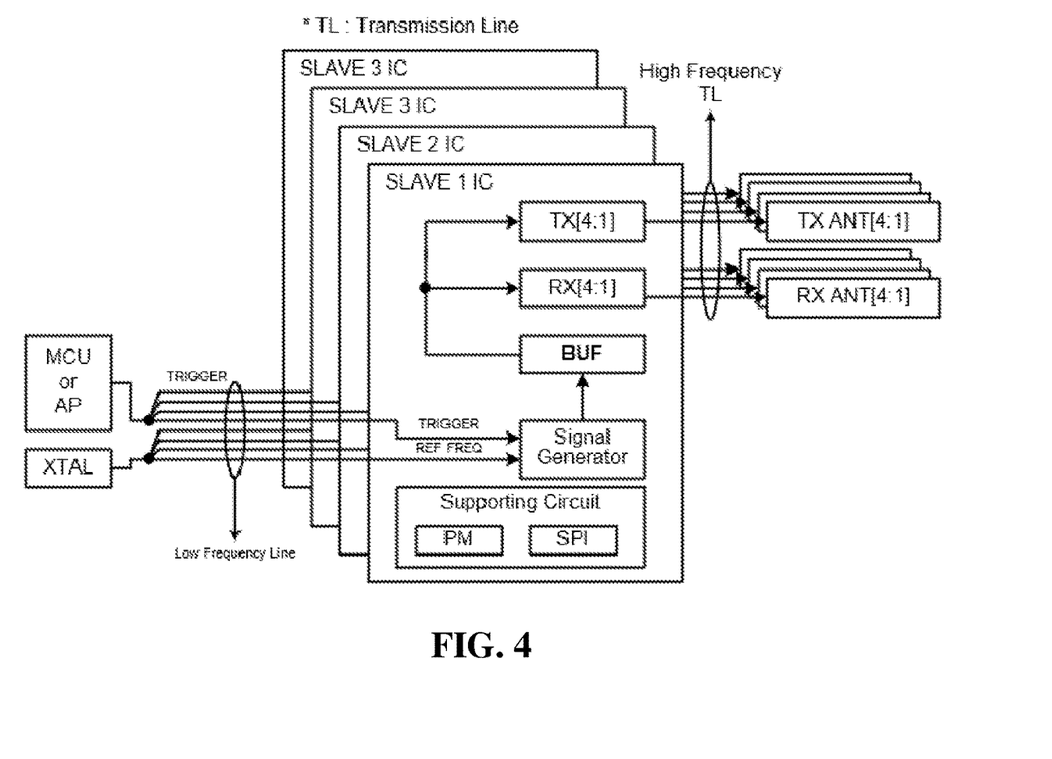
Figure 5:
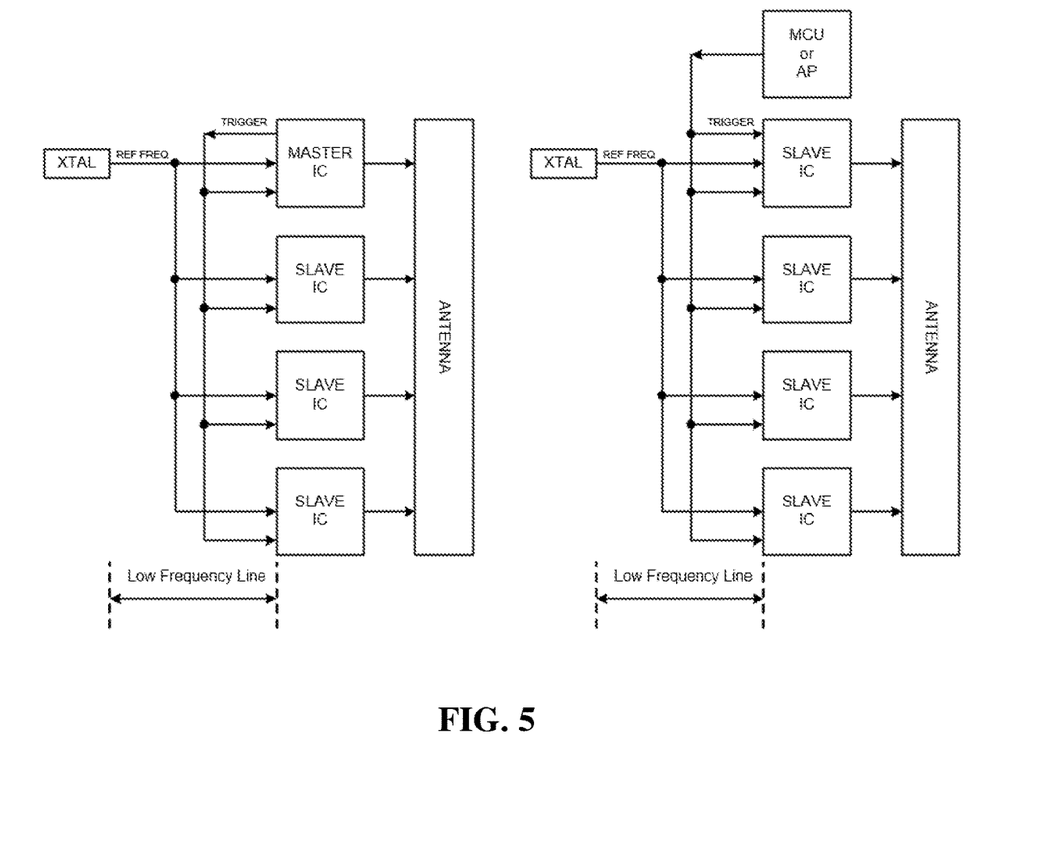

FIGS. 3 to 5 are block diagrams illustrating a structure of a cascaded FMCW radar according to an exemplary embodiment of the present disclosure.

Referring to FIGS. 3 to 5, the cascaded FMCW radar according to the present disclosure may include the crystal oscillator XTAL, the transceiver chip IC, and the antenna TX ANT.

The crystal oscillator XTAL generates a signal having a reference frequency having low-frequency characteristics to deliver to the transceiver chips. Respective transceiver chips ICs are disposed in the form of a plurality of cascades, and the output signal having the high-frequency characteristics is generated through the signal generator provided inside each transceiver chip, and the output signal is modulated for the FMCW radar operation. That is, a high-frequency output signal generated by delivering the reference frequency signal only to one IC is not divided into the remaining transceiver chips, but the reference frequency signal is simultaneously input into all transceiver chips. That is, all transceiver chips are synchronized with the crystal oscillator used as the reference frequency.

Since the reference frequency has the low-frequency characteristics, it is easier to design and implement the circuit than those of the frequency having the high-frequency characteristics. Further, an interference between the ICs is small.

In this case, the signal generator may be a voltage-controlled oscillator (VCO), a phase lock loop (PLL), and an FMCW generator, and the transceiver chip may be four transceiver chips including four transmission channels and four reception channels. In this case, the generated output signal is a higher frequency than the reference frequency generated from the crystal oscillator, and in some exemplary embodiments, may have a frequency 10 times or higher than the reference frequency. For example, the reference frequency signal generated from the crystal oscillator may have a reference frequency of 80 MHz, and the generated output signal may have a frequency of 77 GHz. However, the reference frequency signal is not particularly limited thereto, and may include all radio signals having the low-frequency and high-frequency characteristics.

Meanwhile, in order to drive the cascaded FMCW radar, frequency characteristics of the output signal output from the transmitter of the transceiver chips and the LO frequency used by the receiver mixer should be the same. That is, since a plurality of transceiver chips simultaneously operate in a cascade array, the plurality of transceiver chips should be synchronized so that phases and magnitudes of used frequencies are the same, and when the plurality of transceiver chips are not synchronized, there is a problem in that the radar does not normally operate due to a time difference between respective transceiver chips.

To this end, the cascaded FMCW radar of the present disclosure includes one master transceiver chip generating the trigger signal TRIGGER, or an external MCU or AP. When the master IC generates the trigger signal, at least one slave transceiver chip SLAVE IC receiving the trigger signal is included. When the trigger signal is generated by the external MCU or AP, at least two slave transceiver chips are included.

That is, all transceiver chips used for the cascaded FMCW radar are synchronized with one crystal oscillator, and starts frequency modulation based on the trigger signal. Specifically, as illustrated in FIGS. 3 to 5, the trigger signal generated by the master transceiver chip is also input into the master transceiver chip in addition to the slave transceiver chip, and may synchronize the frequency characteristics of the output signals with synchronizing the frequency characteristics of the output signals and the trigger signal generated by the external MCU or AP.

In this case, all signal generators inside all transceiver chips start the frequency modulation according to the trigger signal, and an output signal having modulated high frequency characteristics is delivered to the antenna TX ANT.

Figure 6:
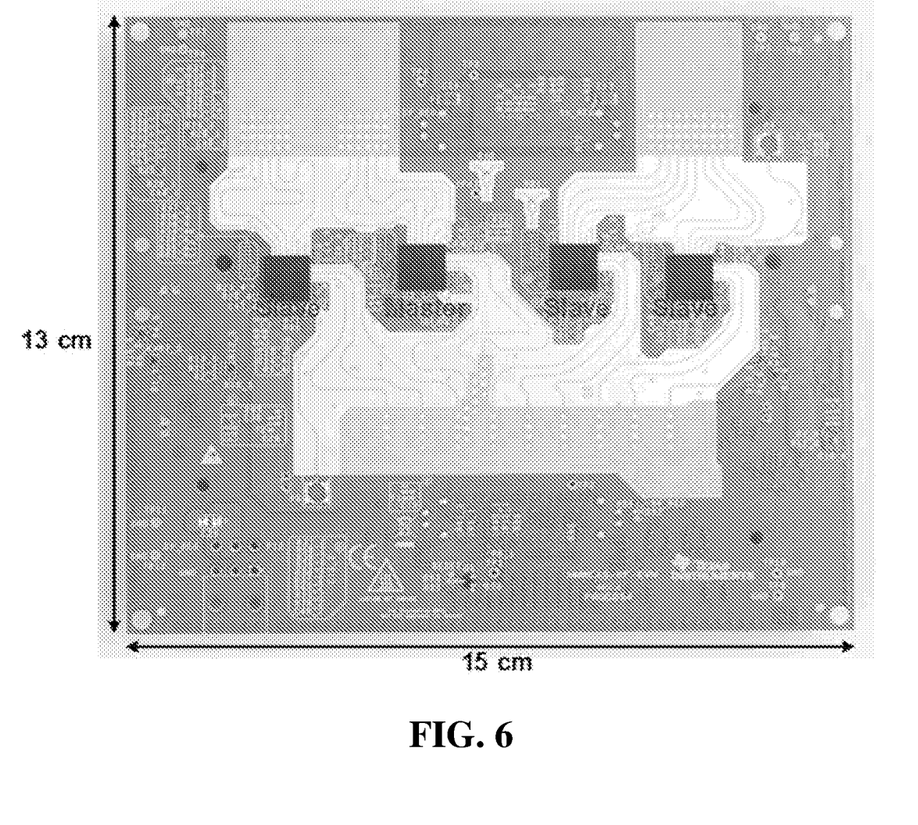
FIG. 6 is a diagram illustrating a PCB of the cascaded FMCW radar in the related art.
Figure 7:
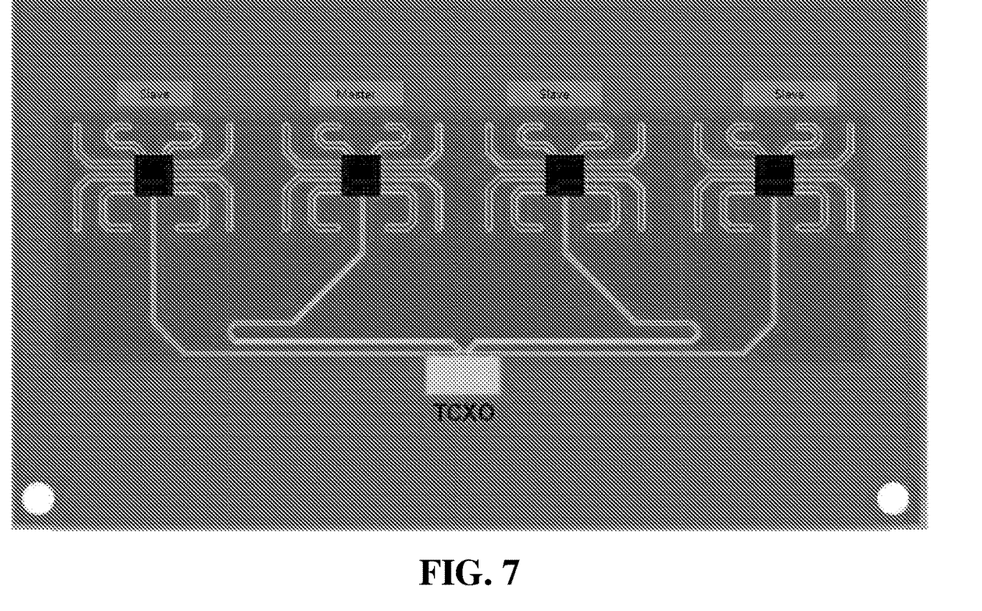
FIG. 7 is a diagram illustrating a PCB of the cascaded FMCW radar according to an exemplary embodiment of the present disclosure.

FIG. 6 is a diagram illustrating a PCB of the cascaded FMCW radar in the related art and FIG. 7 is a diagram illustrating a PCB of the cascaded FMCW radar according to an exemplary embodiment of the present disclosure.

Figure 8:
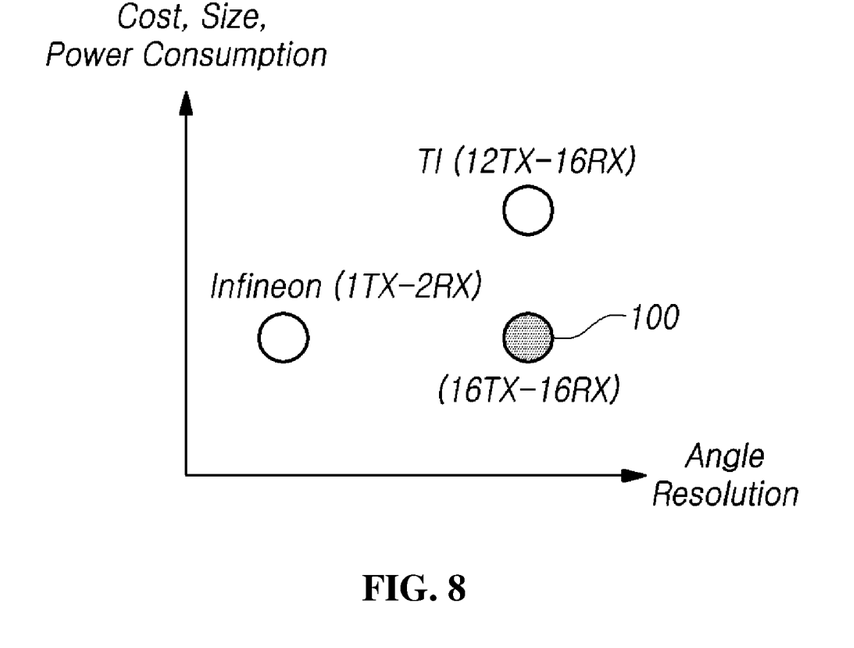
FIG. 8 is a graph illustrating an effect of the cascaded FMCW radar according to an exemplary embodiment of the present disclosure.

Distances of the high-frequency transmission line for dividing the high-frequency signal from respective transceiver chips should be maintained to be the same. Therefore, as illustrated in FIGS. 7 and 8, in the case of the slave transceiver chip disposed close to the master transceiver chip, the RF transmission line may be only twisted as compared with the slave transceiver chip disposed far from the master transceiver chip. However, it is very difficult to design the circuit by twisting the RF transmission line by frequency interference having the high-frequency characteristics. Further, in order to expand an additional transceiver chip to the existing PCB, the circuit should be designed again from the beginning.

In the cascaded FMCW radar of the present disclosure, only the reference frequency for generating the high-frequency signal by each transceiver chip may be input into each transceiver chip without using a high-frequency signal dividing technique. Therefore, since the transmission line for dividing the reference frequency is designed as a low frequency line, the PCB design for the transmission line is easy and the frequency interference is small, so that the circuit design is very easy even upon expanding the additional transceiver chip.

Further, in the cascaded FMCW radar of the present disclosure, since the signal generated by the crystal oscillator is immediately delivered to the transceiver chip, a length of the transmission line decreases, and the power divider is not required. Accordingly, the circuit may be miniaturized, and there may be an effect of cost reduction in terms of an economic aspect.

Further, the transceiver chip of the present disclosure may include a power amplifier (not illustrated) that assists generation of the output signal by amplifying an electrical performance of the signal generator. As described above, in the cascaded FMCW radar of the present disclosure, since the power divider Power Divider is not required, a required performance of the power amplifier may be reduced, and power consumed in the entire radar may also be reduced.

FIG. 9 is a graph illustrating an effect of the cascaded FMCW radar according to an exemplary embodiment of the present disclosure.

In a cascaded FMCW radar 100 of the present disclosure, the number of channels of all radars is increased using a plurality of transceiver chips (16 TX-16 RX), so angle resolution which is the performance of the radar is higher than that of a conventional radar (Infineon) of a small number of channels (1 TX-2 RX).

Further, as compared with the cascaded FMCW radar T1 in the related art, which uses the power divider of FIGS. 1 and 2, in the cascaded FMCW radar 100 of the present disclosure, it may be confirmed that cost, size, and power consumption are small while maintaining the angle resolution similarly.

As described above, according to an exemplary embodiment of the present disclosure, a cascaded FMCW radar may easily implement and expand a circuit using a reference frequency having low-frequency characteristics.

Further, according to an exemplary embodiment of the present disclosure, the cascaded FMCW radar removes transmission line and power distributor to miniaturize the circuit to enhance economics.

Further, according to an exemplary embodiment of the present disclosure, the cascaded FMCW radar reduces a requested performance of a power amplifier to reduce power consumption of an entire system.

Although the present disclosure has been described above by the drawings, but the present disclosure is not limited by the exemplary embodiments and drawings disclosed in the present disclosure, and various modifications may be made from the above description by those skilled in the art within the technical ideas of the present disclosure. Moreover, even though an action effect according to a configuration of the present disclosure is explicitly disclosed and described while describing the exemplary embodiments of the present disclosure described above, it is natural that an effect predictable by the corresponding configuration should also be conceded.

What is claimed is:

1. A cascaded FMCW radar comprising:
a crystal oscillator generating a reference frequency signal having low-frequency characteristics;
a cascade-array transceiver chip generating an output signal having high-frequency characteristics using the reference frequency signal through a signal generator provided therein, the cascade-array transceiver chip including one master transceiver chip and at least one slave transceiver chip connected to the one master transceiver chip;
an antenna transmitting the generated output signal to an outside in a form of an electromagnetic wave or receiving the electromagnetic wave from the outside; and
an RF transmission line designed as a low-frequency line connecting the crystal oscillator, the one master transceiver chip, and the at least one slave transceiver chip,
wherein the reference frequency signal is directly transmitted from the crystal oscillator to the one master transceiver chip and the at least one slave transceiver chip through the low-frequency RF transmission line, and is simultaneously input to the one master transceiver chip and the at least one slave transceiver chip, and
wherein the reference frequency signal is input to the signal generator of the at least one slave transceiver chip and modulated into the output signal having high-frequency characteristics.

2. The cascaded FMCW radar according to claim 1, wherein
the one master transceiver chip is configured to generate a trigger signal,
the at least one slave transceiver chip is configured to receive the trigger signal, and
the trigger signal generated by the one master transceiver chip is also input to the one master transceiver chip.

3. The cascaded FMCW radar according to claim 2, wherein the one master transceiver chip and the at least one slave transceiver chip are synchronized by starting frequency modulation based on the trigger signal.

4. The cascaded FMCW radar according to claim 1, wherein the signal generator includes a voltage-controlled oscillator (VCO), a phase lock loop (PLL), and a radar waveform generator.

5. The cascaded FMCW radar according to claim 1, wherein the output signal has a frequency 10 times or higher than the reference frequency.

6. The cascaded FMCW radar according to claim 1, wherein the cascade-array transceiver chip includes a power amplifier (AMP) that assists generation of the output signal by amplifying an electrical performance of the signal generator.

7. The cascaded FMCW radar according to claim 5, wherein the reference frequency is 80 MHz, and a frequency of the output signal is 77 GHz.

* * * * *